E. D. BEAUMONT.
VEHICLE WHEEL.
APPLICATION FILED FEB. 12, 1920.
1,394,882.
Patented Oct. 25, 1921.
2 SHEETS—SHEET 2.
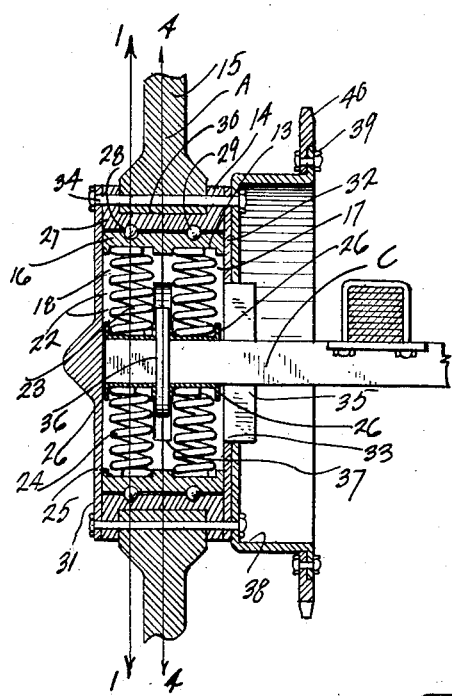
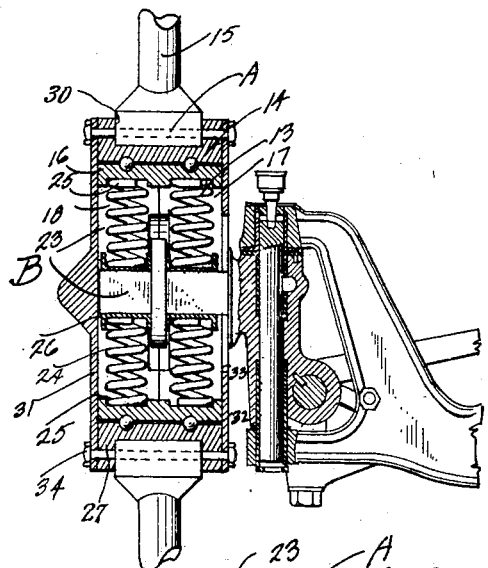
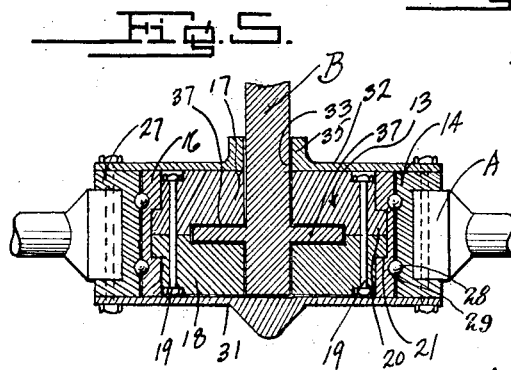
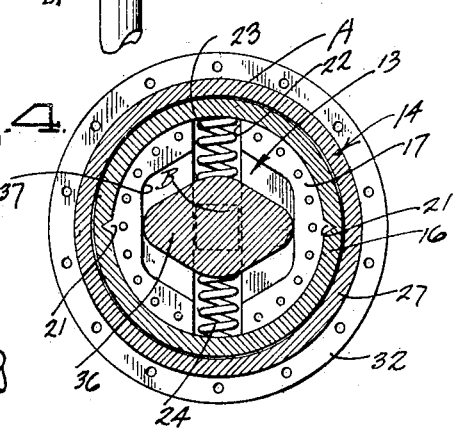
E.D.Beaumont
Inventor

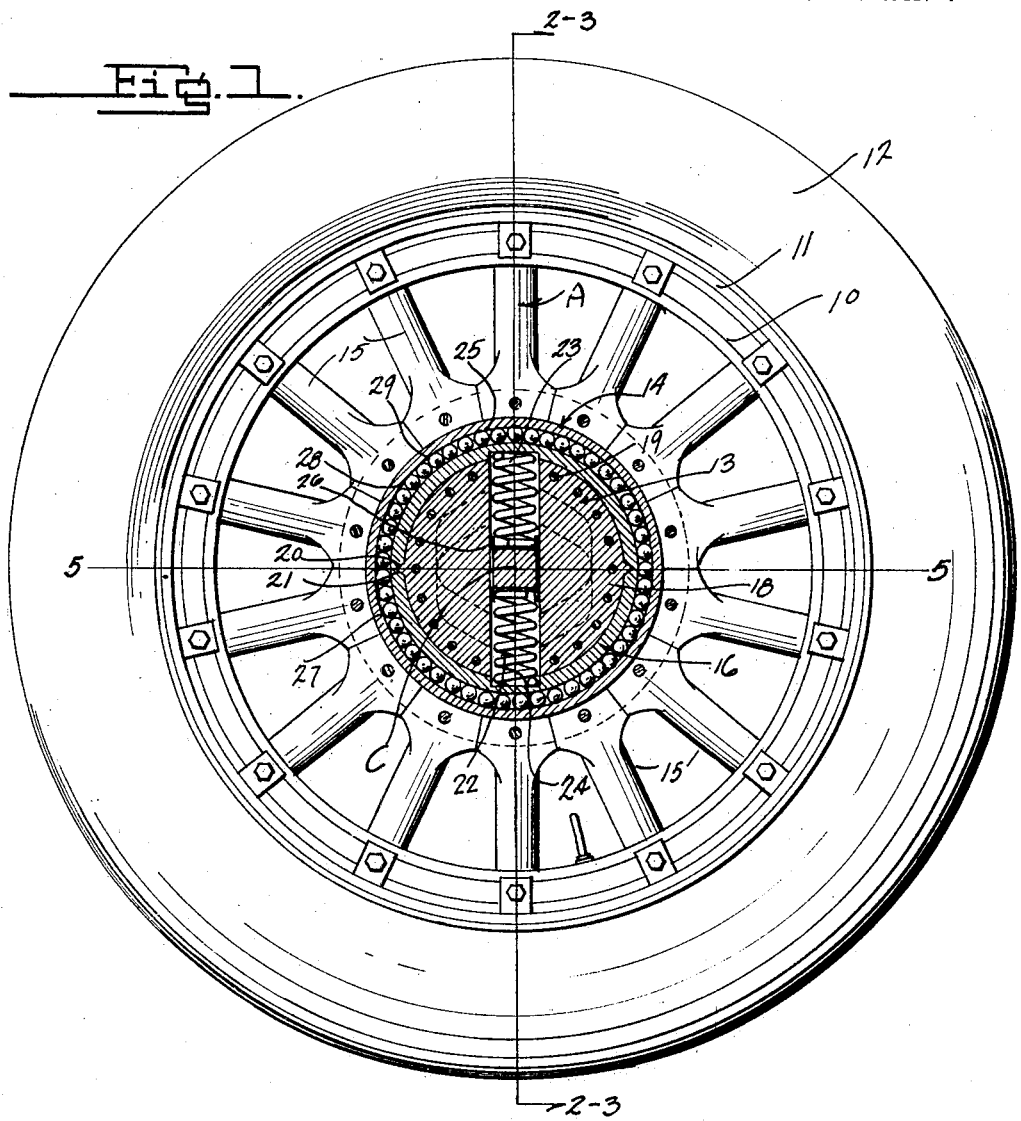

UNITED STATES PATENT OFFICE.

EDWARD D. BEAUMONT, OF PHOENIX, ARIZONA, ASSIGNOR OF ONE-HALF TO JEANG YING HUNG, OF PHOENIX, ARIZONA.

VEHICLE-WHEEL.

1,394,882.       Specification of Letters Patent.      Patented Oct. 25, 1921.

Application filed February 12, 1920. Serial No. 358,280.

*To all whom it may concern:*

Be it known that I, EDWARD D. BEAUMONT, a citizen of the United States, residing at Phoenix, in the county of Maricopa and State of Arizona, have invented certain new and useful Improvements in Vehicle-Wheels, of which the following is a specification.

This invention relates to vehicle wheels, and the primary object of the invention is to provide an improved vehicle wheel having a resilient inner hub so as to permit a resilient connection between the wheel and the vehicle axle and thereby prevent shocks from being transmitted to the vehicle body incident to the travel of the vehicle over a road way.

Another object of the invention is to provide an improved vehicle wheel embodying a non-rotatable inner hub having a vertical sliding spring supported member arranged to engage the vehicle axle and thereby permit radial movement of the vehicle wheel in relation to the axle.

A further object of the invention is to provide an improved means for connecting the inner resilient hub of the vehicle to the outer rotatable hub so as to absolutely prevent any lateral movement of the hubs in relation to one another.

A further object of the invention is to provide an improved means for connecting the novel resilient hub of the vehicle wheel to the vehicle axle so as to permit movement of the hub radially of the axle and to prevent movement thereof laterally of the axle.

A still further object of the invention is to provide an improved vehicle wheel of the above character which is durable and efficient in use, one that is simple and easy to manufacture, and one which can be placed upon the market at a resonable cost.

Other objects of the invention will appear in the following detailed description taken in connection with the drawings, forming a part of this specification, and in which drawings:

Figure 1 is a side elevation of the improved wheel showing the hub thereof in section, taken on the line 1—1 of Fig. 2.

Fig. 2 is a section taken on the line 2—2 of Fig. 1 showing the wheel attached to the rear axle of a vehicle of the chain drive type.

Fig. 3 is a section taken on the same line as Fig. 2 showing the wheel attached to the front steering axle.

Fig. 4 is a detail section taken on the line 4—4 of Fig. 2, and

Fig. 5 is a detail section taken on the line 5—5 of Fig. 1.

Referring to the drawings in detail, wherein similar reference characters designate corresponding parts throughout the several views, the letter A indicates the improved wheel, B, the front axle of a motor vehicle, and C the rear axle of a motor vehicle.

The improved vehicle wheel A includes the felly 10 having arranged thereon any preferred type of rim 11, for supporting a tire 12, the inner non-rotatable hub 13, the outer rotatable hub 14, and the spokes 15 for connecting the outer hub 14 with the felly 10.

The tire 12 may be of any preferred make, either of the pneumatic, spring or solid type. The felly 10 and the spokes 15 as shown are made of wood, but it is to be understood that a metallic felly and wire spokes can be used with equal advantage.

The inner hub 13 includes the annular metallic ring 16 and the circular blocks 17 and 18, which are arranged in abutting relation and secured together by suitable bolts or the like 19. These blocks 17 and 18 are disposed in the annular ring 16 and are held against relative movement in relation to the ring 16 by V-shaped lugs 20 formed on the blocks 17 and 18 at opposite diametric points which engage the V-shaped notches 21 formed in the inner surface of the ring 16. The blocks 17 and 18 are provided with a diametrically extending slot 22, in which are positioned upper and lower expansion coil springs 23 and 24, which are preferably arranged in pairs. The outer terminals of the springs 23 and 24 are positioned in suitable sockets 25 formed in the inner face of the rings 16. The inner ends of the springs 23 and 24 are fitted in cups 26 which engage the upper and lower faces of the vehicle axles. The outer hub 14 includes the annular ring 27 having ball races 28 formed therein, which receive the ball bearings 29 carried by the outer face of the inner ring 16. The provision of the ball bearings 29 permits the easy independent rotation of the outer hub in relation to the inner hub. The outer surface of the ring 27 is provided with suitable sockets 30 for the reception of the inner edges of the spokes 15. A disk 31 is carried by the outer side of the ring 27, while the inner side carries a disk 32, which is provided with a vertical central slot 33, for the reception of the vehicle axle. The disks 31 and 32 are secured in position by suitable bolts or the like 34 which also extends through the spokes 15 for preventing accidental displacement thereof out of the sockets 30. If so desired the walls of the vertical slots 33 may be provided with outwardly extending right triangular flanges 35 forming a guide for the axle.

The axles B and C are both of the dead or non-rotatable type and are provided with an outwardly extending collars 36, which are of substantially diamond shape. The inner ends of the cups 26 engage the opposite faces of the collars 36 and prevents relative movement of the axles in relation to the vehicle wheels. The inner walls of the slots 22 formed in the blocks 17 and 18 are provided with inwardly extending grooves 37 which are shaped to conform to the configuration of the collar 36. The upper walls of the grooves 37 form stops for the collar 36 and limit the upward movement of the axles in relation to the hubs of the wheels.

When the vehicle wheel is to be used on the rear axle C and is to be used as the drive wheel of a chain drive motor vehicle, the brake drum 38 is secured to the outer face of the disk 32 by the bolts 34. The brake drum 38 is provided with a suitable slot which registers with the slot 33 formed in the disk 32. The outer edge of the brake drum 38 is provided with an outwardly extending annular flange 39, to which is riveted or otherwise secured the sprocket wheel 40 around which is trained the drive sprocket chain (not shown).

From the foregoing description it can be seen that an improved vehicle wheel is provided which will effectively eliminate the transmission of shocks from the vehicle wheel to the vehicle body, which is of exceedingly simple and durable construction and which is applicable to various types of motor vehicles.

Changes in details may be made without departing from the spirit or scope of my invention; but,

I claim:

In combination with a vehicle axle, of a resilient wheel including an inner hub, an outer hub rotatably mounted on the inner hub, a block non-rotatably mounted in the inner hub having a vertical slot therein arranged to slidably receive the axle, the opposite walls of the slot being provided with vertically disposed guide ways having inclined upper and lower stop shoulders, a rigid collar carried by the axle slidably mounted in the guide way, the collar including upper and lower inclined stop shoulders for engaging the shoulders formed on the guide ways to limit the sliding movement of the inner hub and axle in relation to each other, the side faces of the collar engaging the inner faces of the guide ways to prevent lateral movement of the axle in relation to the inner hub, and expansion springs disposed in the slots engaging the end walls of the slots and the opposite faces of the axles.

EDWARD D. BEAUMONT.